United States Patent
Williams

(10) Patent No.: US 11,953,112 B2
(45) Date of Patent: Apr. 9, 2024

(54) VIBRATION RELEASE SYSTEM FOR PIPELINE ITEMS

(71) Applicant: Hydrosave UK Limited, Kettering (GB)

(72) Inventor: Stuart Williams, Kettering (GB)

(73) Assignee: HYDROSAVE UK LIMITED, Kettering (GB)

(*) Notice: Subject to any disclaimer, the term of this patent is extended or adjusted under 35 U.S.C. 154(b) by 142 days.

(21) Appl. No.: 17/284,497

(22) PCT Filed: Oct. 11, 2019

(86) PCT No.: PCT/GB2019/052896
§ 371 (c)(1),
(2) Date: Apr. 12, 2021

(87) PCT Pub. No.: WO2020/074916
PCT Pub. Date: Apr. 16, 2020

(65) Prior Publication Data
US 2022/0128163 A1   Apr. 28, 2022

(30) Foreign Application Priority Data
Oct. 12, 2018 (GB) .................................. 1816648

(51) Int. Cl.
*F16K 29/00* (2006.01)
*B08B 7/02* (2006.01)
(Continued)

(52) U.S. Cl.
CPC ............... *F16K 29/00* (2013.01); *B08B 7/02* (2013.01); *B08B 9/043* (2013.01); *E21B 31/005* (2013.01); *F16K 31/16* (2013.01); *F16K 37/0083* (2013.01)

(58) Field of Classification Search
CPC ...... F16K 29/00; F16K 37/00; Y10T 137/043; Y10T 137/4273; E21B 31/005; B08B 9/043; B08B 7/02; B08B 15/52
See application file for complete search history.

(56) References Cited

U.S. PATENT DOCUMENTS 5,913,495 A    6/1999  Maciel et al.
6,217,660 B1 * 4/2001  Shahvandi .......... C23C 16/4407
                                                    118/715
(Continued)

FOREIGN PATENT DOCUMENTS

GB    2 378 997    2/2003
GB    2 483 072    2/2012
(Continued)

OTHER PUBLICATIONS

International Search Report for PCT/GB2019/052896 dated Jan. 7, 2020.

*Primary Examiner* — Atif H Chaudry
(74) *Attorney, Agent, or Firm* — Woodard, Emhardt, Henry, Reeves & Wagner, LLP

(57) ABSTRACT

There is provided apparatus and a method of releasing one or more seized components of an item using an adapter in location on said item, a vibration generating means in location with said adapter so as to allow vibration to be imparted from the said vibration generating means to the said one or more seized components; retaining the vibration generating means with the said item at a required orientation via engagement means, operating the vibration generating means and control means allow the control of the frequency of vibration to be within a predetermined range. This therefore allows the effective releases of the component of the item to allow the item, such as a valve of a pipeline to then be operated.

14 Claims, 3 Drawing Sheets

Figure 1:
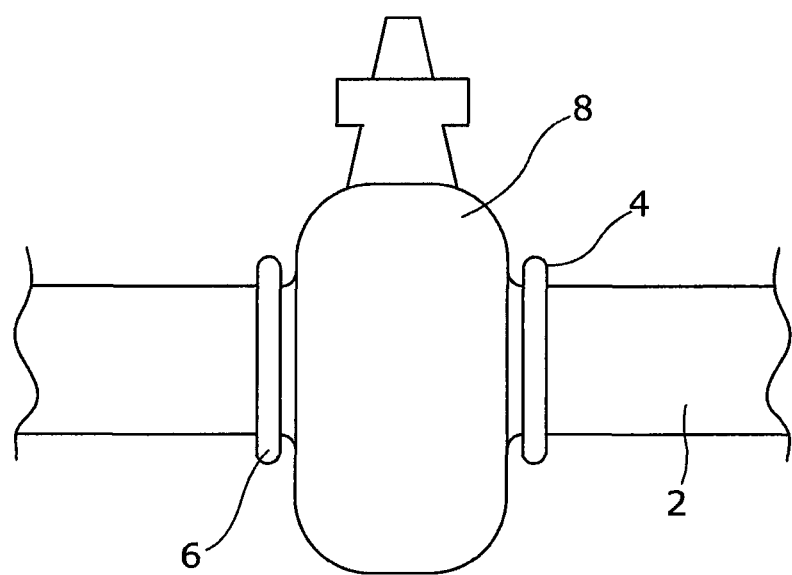

(51) Int. Cl.
*B08B 9/043* (2006.01)
*E21B 31/00* (2006.01)
*F16K 31/16* (2006.01)
*F16K 37/00* (2006.01)

(56) References Cited

U.S. PATENT DOCUMENTS 6,698,444 B1 * 3/2004 Enston .................. C10M 129/72
 137/246.22
2005/0184266 A1 * 8/2005 Enston .................... F16K 31/00
 251/291

FOREIGN PATENT DOCUMENTS

GB 2 512 320 10/2014
JP 2000146000 5/2000

* cited by examiner

VIBRATION RELEASE SYSTEM FOR PIPELINE ITEMS

The invention to which this application relates is apparatus and a method for allowing the operation of an item attached to a pipeline, and in particular, although not necessarily exclusively, an item, such as a valve, which is provided in fluid connection with the fluid such as a liquid or gas, flowing along the pipeline, and which is provided to be changeable between operating conditions by movement of a component of the item.

In particular, the apparatus and method of the invention are provided to be utilised in allowing the release of the said component if the same has seized and therefore renders the item inoperable which, if not corrected, can cause complete failure of the item which, inturn, can cause leakage of fluid from the item and/or pipeline and/or if there is a hazardous situation which arises with regard to the pipeline, and the said component has seized the item cannot then be operated to minimise or remove the hazardous situation. For example, if the item is a valve, and the component of the same cannot be operated to close the pipeline, or alternatively the item is a pressure release means which cannot be operated to allow the release of pressure and/or fluid from the pipeline, then the pipeline may fail and leakage occurs. There are also significant risks which may be caused by the leakage of liquid from the pipeline as a result of the item, such as a valve being seized and therefore being unable to be used to seal off a pipeline. In particular, if the liquid which leaks is waste water and/or includes hydrocarbons there can be significant environmental impact if the pipeline cannot be isolated.

Furthermore, when one considers that the items can often be fitted to pipelines carrying potentially hazardous materials therealong and/or are located in hazardous environments, there is a need to be able to provide the system in accordance with the invention in a manner which allows the same to be operable without risk being created.

It is known that items for use on pipelines, are prone to corrosion and/or seizure. One possibility of avoiding this conventionally, is to implement a maintenance programme in which the items are operated at regular intervals but, in many environments this is hazardous, impractical and/or expensive. Furthermore, the components of the item often seize as a result of particulates which build up and, while corrosion can cause the particles to build up overtime, other, more specific, operations or failures of the pipeline, can cause foreign bodies or fragments to dislodge from the pipeline, to cause the relatively rapid seizure of the components of the item. Regardless of the cause, the subsequent repair and/or removal of the item and replacement with a new component, which is conventionally the available option, is expensive both in terms of operator time, the cost of providing replacement components and also in relation to the downtime of operation of the pipeline to which the items are attached.

In the Applicant's patent application there is discussion of the use of a method to identify the resonant frequency of the mass of the item and then providing a vibration unit which is operated at the identified resonant frequency to cause the release of the seized components of the item and thereby return the item to an operable condition.

While the Applicant's patent application does provide one possible solution to the release of a ceased component, it is found that the need to firstly, identify the resonant frequency of operation of the item can be difficult to achieve in many different environmental conditions and can be time consuming inasmuch that a transducer is first required to be utilised to identify the resonant frequency and, once identified, the vibration unit is then required to be operated and controlled to operate at the resonant frequency. It is also found that the resonant frequency of the item may change as the component is gradually released.

The aim of the present invention is therefore to provide an improved apparatus and method which allows the release of seized components of an item in order to return the item to an operable condition. A further aim is to allow the release to be achieved in a reduced time and with a reduced requirement for apparatus to be provided on site and also to provide the apparatus in a format which allows the possibility of usage of the apparatus in hazardous and/or confined spaces.

In a first aspect of the invention there is provided apparatus for operation in conjunction with an item fitted to a pipeline in order to release one or more components of the item from a seized or partially seized condition said apparatus including engagement means to engage the apparatus with said component, vibration generating means to impart a vibrating effect on the said item when engaged therewith, and wherein the said apparatus is provided with control means to cause the vibration generating means to impart said vibration to the said item at a frequency within a predetermined frequency range.

In one embodiment, the said predetermined frequency range is the same regardless of the particular item with which the apparatus is to be used. Alternatively the said predetermined frequency range is set with respect to the identity of the item with which the apparatus us to be used at that time.

In one embodiment the said predetermined frequency range is the same and hence applicable to all items in relation to which the apparatus is approved to be used. In one embodiment a database is provided which indicates the maximum advisable torque valves which should be used in relation to specific item types and/or sizes.

In one embodiment a data base is provided to allow the recordal of historical data relating to items.

Typically the said item is an item which is connected to the pipeline so as to be in fluid communication therewith and, when operable the item is movable by operation of the one or more components between open and closed conditions and, when the said at least one component is seized the change in condition is not possible.

In one embodiment, the said control means monitors, during use of the apparatus, the frequency of the vibration imparted to the said item and compares the same to the said predetermined frequency range and, if it is found that the monitored frequency is outside of the predetermined frequency range the operation of the vibration generating means is adapted until the frequency again falls within the said predetermined frequency range.

In one embodiment, the said control means control the duration of operation of the said vibration generating means In one embodiment, torsion is applied to a shaft of the item connected to the component which is seized simultaneously with the generation of the vibration.

In one embodiment, the apparatus includes a series of adapters which can be selectively placed on the said item so as to allow the vibration generating means to be connected therewith. In one embodiment, the vibration generating means is located in connection with the interior of an aperture provided in the adapter.

Typically the torque which is applied to the item is dependent on the particular type of component and the direction of actuation of the component is clockwise and/or anticlockwise with the same being selected dependent upon the valve type and location.

In one embodiment, engagement means are provided to ensure that the apparatus is retained in position with the said item, and typically the said seized one or more components and to which the vibration is to be imparted.

In one embodiment, the engagement means retains the apparatus in location with the item so as to allow the apparatus to be mounted in a range of positions with respect to the item such as on top of, underneath or to either side of the item and is retained in position and therefore allows a greater possibility of usage of the apparatus when one considers that the position of the pipeline and the item are fixed and the apparatus may be required to be used in a confined location.

In one embodiment, the vibration generating means is provided with a pneumatic air supply to allow operation of the same.

In another embodiment, and in particular where the use of the apparatus is required in hazardous environment, the power for operation of the vibration generating means is provided in the form of a pneumatic air supply only with a range of the location of the item and apparatus in use so that there is no electrical risk and the apparatus can meet the requirements of the EEC directive Appareils destinés à être utilisés en ATmospherés EXplosibles (ATEX).

Typically the apparatus is free standing and supported in position via the engagement means which connect the apparatus to the said item to form an integral unit during use of the apparatus. This therefore means that the apparatus can be used remotely in potentially hazardous areas and with no need for an operator to be present at the site of operation during use of the apparatus.

In one embodiment the item is a valve and the component which is seized is that part which is required to be turned or otherwise moved in order to allow the valve to be moved between closed and open positions.

In a further aspect of the invention there is provided a method of releasing one or more seized components of an item provided in connection with a pipeline, said method comprising the steps of; placing an adapter in location on said item, attaching a vibration generating means in location with said adapter so as to allow vibration to be imparted from the said vibration generating means to the said one or more seized components; retaining the vibration generating means with the said item at a required orientation via engagement means, operating the vibration generating means and wherein control means allow the control of the frequency of vibration to be within a predetermined range. In one embodiment the method include applying a torque simultaneously with the vibration to the said one or more components.

Figure 2:
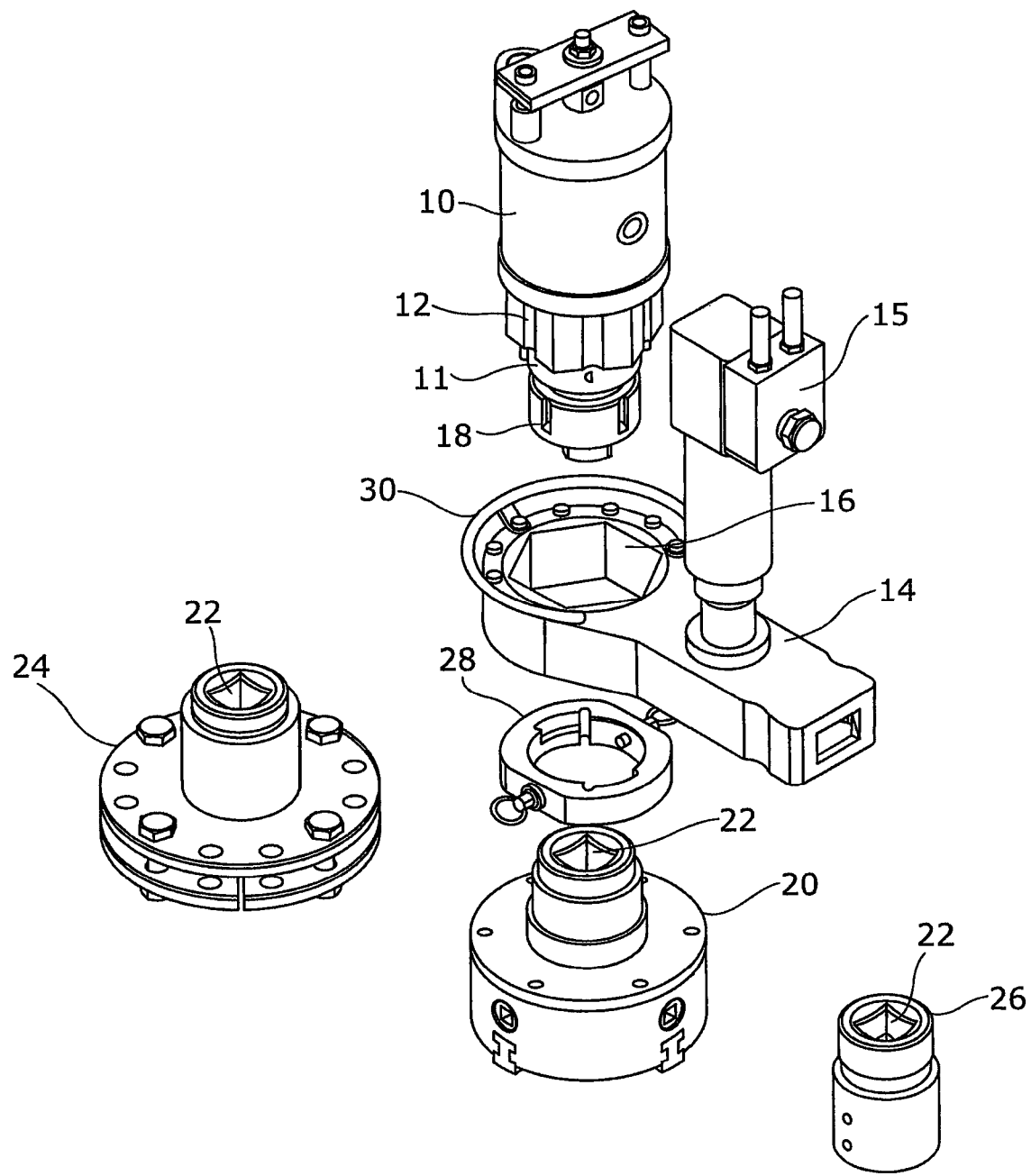
Figure 3:
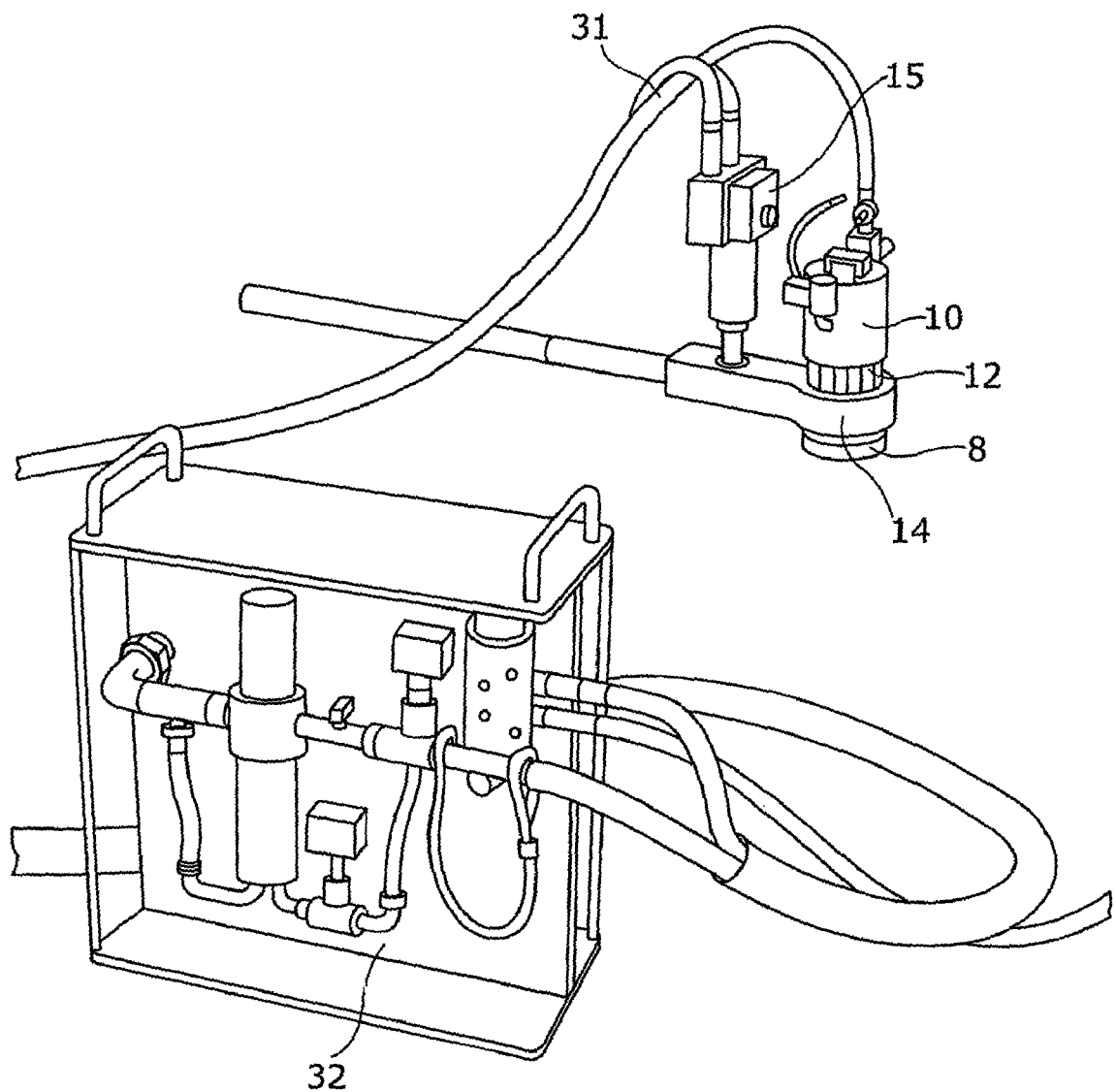

Specific embodiments of the invention are now described with reference to the accompanying drawings; wherein FIG. 1 illustrates schematically a pipeline and item with which the apparatus in accordance with the invention can be used;

FIG. 2 illustrates a perspective view of apparatus parts in accordance with one embodiment of the invention; and FIG. 3 illustrates the apparatus of the invention in use on an item to release components of the same.

Referring firstly to FIG. 1 there is illustrated a length of a pipeline 2 which is provided to allow a fluid to flow along the interior of the same. The pipeline has flanges 4, 6 and located to the flanges is an item 8, in this embodiment in the form of a valve which is provided as an integral part of a pipe asset and usually bolted in by the flanges. Occasionally process/gas valves are welded in situ on the pipeline. The valve is provided to be movable between open and closed conditions by rotation of a component provided as part of the valve. The component has seized and cannot be moved then the valve is retained in either the open or closed conditions, is inoperable and is therefore rendered ineffective for its purpose.

In accordance with the invention, if it is found that the valve item 8 or any other item, has a component which is seized then the apparatus and method in accordance with invention can be used. An initial step is therefore to identify the item and ascertain it's condition via visual assessment and/or using assessment apparatus.

When the item has been identified as having seized the apparatus and method in accordance with the invention can be used, which is a completely mechanical process and one example of the same is provided in FIGS. 2 and 3 in which there is illustrated the component parts of the apparatus. In this embodiment the apparatus includes a vibration generating means 10 including a vibration motor which is located via locating means 12 in an aperture 16 in gearbox 14 connected to an actuation module 15 which causes, under control of the pneumatic control means 32, the operation of the vibration generating means 10 to generate the vibration at a particular frequency along with adjustment to the amplitude of vibration. The gearbox and actuation module are controlled by control means 32, which may be located remotely from the item 8 to which the apparatus is fitted and in this embodiment the control means provides pneumatic air which moves through connecting tubes 31 between the vibration generating means 10, the actuation module 15 and the control means 32.

The end 18 of the vibration generating means 10 is located in a port 22 invariable mounting plate 20 which can be used for both straight and tapered fitting arrangements and hence allows the apparatus to be mounted onto the valve item 8. Instead of the variable mounting plate 20, the end 18 can be located in the port 22 provided in a clamp assembly 24 for use when the item has a component in the form of a manually operable handwheel, or located in a port 22 in a tapered adapter 26 and it should be appreciated that there may be provided a range of these adapters of various sized which may be selectively used.

A locking system 28 including a cam lock is provided to allow the parts of the apparatus to be assembled and held in the required positions as the vibration is imparted to the item 8.

Engagement means 30 in the form of a multi axial support ring allows the vibration generating means 10 to be retained in position when in use and allow the same to be held in position regardless of the particular orientation of the apparatus with respect to the item 8 and the pipeline.

In use of the apparatus, the first step is, typically to assess the condition of the item and the type and size of the same then refer to a database such as a look up able to identify any data relevant to operation of the apparatus for that item. The operation of the vibration generating means 10 is controlled so as to operate at a predetermined frequency range of 40 Hz to 45 Hz so as to release the seizure, regardless of the size, location and/or type of the item or asset. A database of torque values to be applied with respect to the item can be referred to and is typically generated from historical data generated from use of the apparatus on previous items within, for example a size range of 3 inches to 48 inches.

Typically the apparatus is capable of producing the required predetermined frequency range by using the control means 32, typically in the form of a pneumatic control unit, to adjust the input to the vibration motor 10 and then monitoring and adjusting the control signals throughout the process along with the amplitude.

In accordance with the invention the identification of the item being in resonance is achieved without the need to monitor and measure the same and so this eliminates the requirement for electronic devices to be used within the hazardous conditions of a confined space and allows the ability to provide full ATEX approved apparatus for utilisation in the various zonal requirements cover under ATEX.

The imparting the frequency to the components of the item can be for a particular period of time until the seizure is determined to have been released.

In accordance with the invention the apparatus is usable in mulita axial arrangement with regard to the item 8 and pipeline 2. In accordance with the invention the assembly parts are assembled in order with the vibration generating means 10 being located into the gearbox 14 by the mating of area 12 into section 16 and, once assembled, the same are maintained as an integral working assembly via the use of the camlock 28. In prior art apparatus, pin locks were used which had a tendency to shear over time and hence caused the uncontrolled disassembly of the parts. In contrast, in the current invention, the locking ring of the camlock slides onto section 11 and is rotated onto locking pins located within the body of section 12, and pin locks are then locked in place but in this case they are provided to ensure that the camlock 28 does not disengage from the locking pins. This lock, in conjunction with the engagement means 30 allows the use of the device in all axes around the pipeline.

In one embodiment, if it is found that that leakage occurs during the use of the apparatus such as by the valve release being achieved an injection repacking material can be utilised to stop any leakage from the packing gland area and in a preferred embodiment the repacking material includes a strand length of active material which allows quick deployment to the leaking area and maintains its structural integrity when the valve is operated. This is opposed to conventional packing material which tends to break down when a valve is operated as the motion of the rotating spindle breaks up the composite material and the water pressure flushes out the carrier material followed by the active material, causing failure of the leak sealing characteristic. In one embodiment the active material contained within the packing material is made up of fibres of a length within the range of 15 mm to 50 mm and in which the carrier fluid is capable of transferring effectively and thereby allowing the active material to retain its form under motion and pressure.

When the seizure has been freed, the item is assessed visually and a torque measurement taken of the operation of the same and this information along with other data pertaining to size, type, position, drive mechanism, number of turns, direction of travel, location geography, photographs, maps and any other useful information is stored on a data base. This ensures that the item operator has a record of the maintenance of the asset and can create efficiencies when deploying operatives to cycle the valve under any situation.

The invention claimed is:

1. Apparatus for operation in conjunction with an item fitted to a pipeline in order to release one or more components of the item from a seized or partially seized condition, said apparatus including engagement means to engage vibration generating means of the apparatus with said one or more components, said vibration generating means provided to impart a vibrating effect on the said item when engaged therewith, and control means and an actuation module to cause the vibration generating means to impart said vibration to the said item at a frequency within a predetermined frequency range and wherein the said control means monitors the frequency of the vibration imparted to the said item and compares the same to the said predetermined frequency range and, if it is found that the monitored frequency is outside of the predetermined frequency range the operation of the vibration generating means is adapted until the frequency of vibration lies within the said predetermined frequency range, wherein said apparatus further includes a pneumatic air supply and connecting tubes which allow the passage of said pneumatic air supply between the vibration generating means, the actuation module and the control means with said control means located remotely from the said item to which the vibration generating means and actuation module are mechanically fitted.

2. Apparatus according to claim 1 characterized in that the said predetermined frequency range is set with respect to the identity of the item with which the apparatus us to be used at that time.

3. Apparatus according to claim 1 characterized in that a database is provided which indicates the maximum torque valves which should be used in relation to specific item types and/or sizes.

4. Apparatus according to claim 3 characterized in that the database is developed with reference to recordal of data relating to historical use of the apparatus with said items.

5. Apparatus according to claim 1 characterized in that the said control means control the duration of operation of the said vibration generating means.

6. Apparatus according to claim 1 characterized in that torsion is applied to a shaft of the item on which the one or more components is seized, simultaneously with the generation of the vibration.

7. Apparatus according to claim 6 characterized in that the apparatus includes a series of adapters which can be selectively placed on the said item so as to allow the vibration generating means to be connected therewith.

8. Apparatus according to claim 7 characterized in that the vibration generating means is located in connection with the interior of an aperture provided in the adapter.

9. Apparatus according to claim 1 characterized in that the engagement means retain the apparatus in location with the item so as to allow the apparatus to be mounted in a range of positions with respect to the item such as on top of, underneath or to either side of the item.

10. Apparatus according to claim 1 characterized in that the apparatus is free standing and supported in position via the engagement means which connect the apparatus to the said item to form an integral unit during use of the apparatus.

11. Apparatus according to claim 1 characterized in that the apparatus includes a locking means to act in conjunction with the engagement means to allow the apparatus to be used at any orientation and remain locked with the component in use.

12. Apparatus according to claim 1 characterized in that wherein the item is a valve.

13. A method of releasing one or more seized components of an item provided in connection with a pipeline, said method comprising the steps of:

at least one operator placing an adapter in location on said item;

attaching a vibration generating means in location with said adapter so as to allow vibration to be imparted from the said vibration generating means to the said one or more seized components;

retaining the vibration generating means with the said item at a required orientation via engagement means, providing an actuation module and operating the vibration generating means, and using control means to control the frequency of vibration to be within a predetermined range, wherein the said control means monitors the frequency of the vibration imparted to the said item and compares the same to the said predetermined frequency range and, if it is found that the monitored frequency is outside of the predetermined frequency range, the operation of the vibration generating means is adapted until the frequency of vibration lies within the said predetermined frequency range, wherein said apparatus further includes a pneumatic air supply and connecting tubes which allow the passage of said pneumatic air supply between the vibration generating means, the actuation module and the control means, with said control means located at a location remote from the said item to allow the operator to withdraw from said item to the remote location once the vibration generating means and actuation module are mechanically fitted to the item and then, at the said remote location, operating the control unit to commence and monitor the imparting of the vibration to the said one or more seized components.

14. A method according to claim 13 wherein the method includes applying a torque simultaneously with the vibration to the said one or more components.

* * * * *